(12) United States Patent
Ono et al.

(10) Patent No.: US 9,696,672 B2
(45) Date of Patent: Jul. 4, 2017

(54) DRIVE TRANSMISSION UNIT, FIXING DEVICE WITH DRIVE TRANSMISSION UNIT, AND IMAGE FORMING APPARATUS HAVING FIXING DEVICE WITH DRIVE TRANSMISSION UNIT

(71) Applicants: Hiroshi Ono, Tokyo (JP); Tetsuo Tokuda, Tokyo (JP); Yoshikuni Sasaki, Kanagawa (JP); Hironori Yamaoka, Kanagawa (JP); Ryohhei Sugiyama, Kanagawa (JP); Yamano Motoyoshi, Kanagawa (JP)

(72) Inventors: Hiroshi Ono, Tokyo (JP); Tetsuo Tokuda, Tokyo (JP); Yoshikuni Sasaki, Kanagawa (JP); Hironori Yamaoka, Kanagawa (JP); Ryohhei Sugiyama, Kanagawa (JP); Yamano Motoyoshi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/132,401

(22) Filed: Apr. 19, 2016

(65) Prior Publication Data

US 2016/0306311 A1 Oct. 20, 2016

(30) Foreign Application Priority Data

Apr. 20, 2015 (JP) .................................. 2015-085839
Jan. 15, 2016 (JP) .................................. 2016-006322

(51) Int. Cl.
*G03G 15/20* (2006.01)
*G03G 21/16* (2006.01)
(Continued)

(52) U.S. Cl.
CPC ......... *G03G 15/2064* (2013.01); *F16H 25/14* (2013.01); *F16H 37/12* (2013.01);
(Continued)

(58) Field of Classification Search
CPC ........... G03G 15/2064; G03G 15/2025; G03G 21/1647; G03G 15/2075; F16H 25/14; F16H 37/12
(Continued)

(56) References Cited

U.S. PATENT DOCUMENTS 8,606,156 B2 * 12/2013 Watanabe .......... G03G 15/2025
399/122
2007/0140754 A1 * 6/2007 Poxon ................ G03G 15/2025
399/327

(Continued)

FOREIGN PATENT DOCUMENTS

JP 2001-125329 5/2001
JP 2008-203534 9/2008
(Continued)

*Primary Examiner* — Sandra Brase
(74) *Attorney, Agent, or Firm* — Harness, Dickey & Pierce, P.L.C.

(57) ABSTRACT

A drive transmission unit transmits driving force to a driven unit including a driven rotator coupled to the drive transmission unit via a unit coupler. The drive transmission unit includes a driving source, a drive transmission member to transmit driving force from the driving source to the driven rotator by engaging the driven rotator, and a basal plate with a turning shaft portion at one end thereof. The basal plate supports the driving source and the drive transmission member thereon. The drive transmission unit is turned around the turning shaft portion together with the driven unit in a direction substantially orthogonal to a direction of a driving reaction force applied to the drive transmission member when the driven rotator receives the driving force from the drive transmission member.

19 Claims, 6 Drawing Sheets

(51) Int. Cl.
*F16H 25/14* (2006.01)
*F16H 37/12* (2006.01)

(52) U.S. Cl.
CPC ..... *G03G 15/2025* (2013.01); *G03G 21/1647* (2013.01); *G03G 2215/0129* (2013.01); *G03G 2215/2032* (2013.01)

(58) Field of Classification Search
USPC .................................................. 399/326, 327
See application file for complete search history.

(56) References Cited

U.S. PATENT DOCUMENTS

| | | | | |
|---|---|---|---|---|
| 2011/0280636 A1* | 11/2011 | Nakamura | ......... | G03G 15/2075 399/327 |
| 2013/0045031 A1* | 2/2013 | Nagata | ............... | G03G 15/2025 399/327 |
| 2014/0064801 A1* | 3/2014 | Shibaki | .............. | G03G 15/2075 399/327 |

FOREIGN PATENT DOCUMENTS

| | | |
|---|---|---|
| JP | 2013-061516 | 4/2013 |
| JP | 2013-120282 | 6/2013 |
| JP | 2014-021205 | 2/2014 |
| JP | 2014-126732 | 7/2014 |

\* cited by examiner

DRIVE TRANSMISSION UNIT, FIXING DEVICE WITH DRIVE TRANSMISSION UNIT, AND IMAGE FORMING APPARATUS HAVING FIXING DEVICE WITH DRIVE TRANSMISSION UNIT

CROSS-REFERENCE TO RELATED APPLICATIONS

This patent application is based on and claims priority pursuant to 35 U.S.C. §119(a) to Japanese Patent Application Nos. 2015-085839 and 2016-006322, respectively filed on Apr. 20, 2015 and Jan. 15, 2016, in the Japan Patent Office, the entire disclosures of which are hereby incorporated by reference herein.

BACKGROUND

Technical Field

Embodiments of the present invention relate to a drive transmission unit, a fixing device with the drive transmission unit, and an image forming apparatus having the fixing device with the drive transmission unit.

Related Art

In an image forming apparatus such as a copier, a printer, a facsimile machine, etc., a toner image is formed on an image bearer based on image information. The toner image is transferred onto a recording medium and is fixed thereto by heat and pressure in a fixing device when the recording medium bearing the toner image thereon is conveyed through the fixing device.

The fixing device includes a fixing member, such as a fixing roller, a fixing belt, etc., with temperature maintained at a specified level and a pressing member brought in pressure contact with the fixing member. Thus, the fixing device fixes the toner image by conveying and heating the recording medium bearing the toner image thereon in a fixing nip formed between the pressing member and the fixing member brought in pressure contact with each other.

In this type of the fixing device, although a prescribed toner adhesion preventing system is employed to prevent adhesion of toner to a surface of the fixing member, a so-called offset unavoidably occurs sometimes. That is, toner borne on the recording medium slightly adheres to the fixing member when it is conveyed through the fixing device depending on image formation conditions, such as a type of recording medium, an image to be formed, installation environment of an apparatus, etc. Since the offset caused in this way (herein after also referred to as "offset toner") remains on the fixing member and/or the pressing member pressed against the fixing member and may be reversely transferred onto the recording medium, degrading the image quality.

To solve such a problem, there are systems that include a cleaner pressed against the pressing member constituting the fixing device to collect toner adhering to the pressing member therefrom. As one example of the known cleaner, a belt-like cleaning web is used in such a manner that the cleaning web is pulled out from a spool that winds the cleaning web around itself and is taken up and collected by another spool after the cleaning web has cleaned the pressing member by wiping off a stain or the like from the pressing member.

When the recording medium is conveyed through the fixing member, cuts and stains, such as sheet dust, the offset toner, etc., are generated sometimes, thereby gradually roughening the surface of the fixing member. Especially, when the recording media of the same size are repeatedly conveyed through the fixing member, both lateral ends of the recording medium P serving as burrs, respectively, tend to roughen and damage corresponding portions of the surface of the fixing member. As a result, such stain and/or roughness on the surface of the fixing member generate a shiny stripe and unevenness in the image, thereby degrading image quality.

To prevent such degradation, it is possible to make a surface of the fixing member uniform by using a prescribed slider that slides along the surface of the fixing member thereby suppressing occurrence of the abnormal image of the shiny stripe or the like in the image formed on the recording sheet. As the slider, a polishing member to polish the surface of the fixing member of the fixing device to recover prescribed surface uniformity of the fixing member may be used. The polishing member is controlled to engage and disengage from the fixing member to maintain good polishing performance.

However, the above-described systems exhibit unstable driving force transmission when a driving force is transmitted from a driving source to the cleaner and the polishing member each serving as a driven member.

SUMMARY

Accordingly, one aspect of the present invention provides a novel drive transmission unit that transmits driving force to a driven unit including a driven rotator and coupled to the drive transmission unit via a unit coupler. The drive transmission unit includes a driving source, a drive transmission member that engages the driven rotator to transmit driving force from the driving source to the driven rotator, and a basal plate with a turning shaft portion at one end thereof. The basal plate supports the driving source and the drive transmission member thereon. The drive transmission unit is turned around the turning shaft portion together with the driven unit in a direction substantially orthogonal to a direction of a driving reaction force applied to the drive transmission member when the driven rotator receives the driving force from the drive transmission member.

Another aspect of the present invention provides a novel fixing device that includes a fixing member to fix a toner image onto a recording medium with heat and a pressing member to press the recording medium against the fixing member with a prescribed size of pressure when the fixing member fixes the toner image onto the recording medium. A contacting condition of the pressing member and the fixing member is adjusted by displacing one of the pressing member and the fixing member regarding the other one of the pressing member and the fixing member. A driven unit including a driven rotator is provided to either engage or disengage from one of the fixing member and the pressing member to apply a post fixing process thereto. A drive transmission unit is coupled to the driven unit. The drive transmission unit includes a driving source, a drive transmission member to transmit driving force from the driving source to the driven rotator by engaging the driven rotator, and a basal plate with a turning shaft portion at one end thereof supporting the drive transmission member thereon. The drive transmission unit is turned around the turning shaft portion together with the driven unit when one of the pressing member and the fixing member is displaced regarding the other one of the pressing member and the fixing member. A turning direction of the drive transmission unit is substantially orthogonal to a direction of driving reaction force applied to the drive transmission member by the driven rotator when the driven rotator receives the driving force from the drive transmission member.

Yet another aspect of the present invention provides a novel image forming apparatus that includes an image forming device to form a toner image on a recording medium, a recording medium conveyor to convey the recording medium from the toner image forming device, and the above-described fixing device. An ejection tray is provided downstream of the fixing device. A recording medium ejector is provided to eject the recording medium bearing the toner image fixed by the fixing device thereon onto the ejection tray.

BRIEF DESCRIPTION OF THE DRAWINGS

A more complete appreciation of embodiments of the present invention and many of the attendant advantages thereof will be more readily obtained as substantially the same becomes better understood by reference to the following detailed description when considered in connection with the accompanying drawings, wherein.

DETAILED DESCRIPTION

In a fixing device, for the purpose of obtaining an optimum contact condition of a pressing member against a fixing member, a position control mechanism is generally provided to bring the pressing member in contact with the fixing member, to adjust a contact pressure thereof against the fixing member, and to separate the pressing member from the fixing member depending on a usage condition and a type of a recording medium. When a cleaner (e.g., a cleaning roller, a cleaning belt) is pressed against the pressing member as a position adjusting target to clean a surface thereof, and is then separated from the pressing member, the surface of the pressing member is not or insufficiently cleaned sometimes. By contrast, when the cleaner is positioned too close to the pressing member, the pressing member is degraded by intensive thrusting force applied thereto. Otherwise, when the cleaner is the cleaning belt, performance of collection of a used cleaning web executed by taking it up is degraded due to increase in torque needed therefor as a problem. Hence, the cleaning web or the cleaning roller is generally configured to follow the pressing device when a position of it is controlled and the pressing device is displaced.

However, when the pressing device is displaced and the cleaning web follows the pressing device, the cleaning web relaxes sometimes due to a change in positional relation between axes of the cleaning web reel roller that takes it up and collects the cleaning web and that of the web feed roller that feeds the cleaning web forward, for example. When such relaxation of the cleaning web grows and thereby disenabling to appropriately take the cleaning web up, cleaning operation thereof becomes defective thereby sometimes generating an abnormal image such as a so-called black spot, etc., in the image, consequently. When the relaxed cleaning web reaches a fixing nip formed between a fixing roller and a pressing roller in the fixing device, the recording sheet can be no longer conveyed downstream through the fixing device.

To solve the above-described problem caused by the relaxed cleaning web, the web feed roller and the cleaning web reel roller are conventionally driven by separate driving sources, respectively. That is, a one-way clutch is placed in each of drive coupling gears for the web feed roller and the cleaning web reel roller to only rotate these rollers in prescribed desired directions thereby preventing inadvertent rotation of each of these rollers. However, since this conventional system needs at least two driving sources and similar parts, a drive system, and accordingly the fixing device, becomes upsized. Further, adjustment of timing of driving each of the web feed and reel rollers becomes complicated when operating these rollers. In addition, relative adjustment of operating time periods for driving the respective web feed and reel rollers becomes complicated when a prescribed length of a brand new cleaning web has been used.

To solve such a problem, various methods have been suggested as of today to downsize and/or save energy of the fixing device and simplify a driving control system for the cleaning mechanism thereof. For example, a known system includes a web feed roller, a cleaning web reel roller, and a web depressing member pressed against a pressing member of a fixing device across a web fed from the web feed roller at a contact area formed between the web depressing member and the pressing member of the fixing device. The known system also includes a single driving source that drives and rotates the web feed and reel rollers as well. The known system further includes a gear train composed of multiple gears capable of transmitting driving force from the driving source to the web feed and reel rollers at the same time. Among the gear train, a prescribed gear that regulates rotation of the web feeding roller includes a rotation direction limiter to only transmit the driving force from the driving source to a rotary shaft of the web feed roller in a prescribed direction.

The cleaning mechanism having the cleaning web is driven by an external driving source, for example. In such a system, however, when the cleaning web moves to follow the pressing member, the external driving source and a driving force transmitting mechanism that propagates driving force thereto from the external driving source (hereafter sometimes referred to as a drive transmission unit) also move as well. Subsequently, the cleaning mechanism with the cleaning web is driven by the drive transmission unit so that the cleaning web brought in contact with the surface of the pressing member is driven at a different peripheral speed from that of the pressing member.

In such configurations, when each of the cleaning mechanism acting as a driven unit and the drive transmission unit engaged therewith are turned together in a prescribed turning direction regarding the pressing member of the fixing device, driving force transmission from the driving source to the driven unit via the drive transmission unit sometimes becomes unstable depending on a relation between the turning direction of these mechanism and unit and a direction of a driving reaction force caused between the driven unit and the drive transmission unit in association with the driving force transmission from the driving source (i.e., when the driven unit is driven by the drive transmission unit). For example, when the direction of the driving reaction force is the same as the turning direction of the driven unit and the drive transmission unit, since a given amount of force is generated between the cleaning mechanism acting as the driven unit and the drive transmission unit in a direction to separate the cleaning mechanism from the drive transmission unit, and accordingly the transmission of driving force become unstable thereby possibly deteriorating cleaning performance of the cleaning mechanism to clean the pressing member of the fixing device.

Hence, one embodiment of the present invention provides a drive force transmitting unit capable of precisely transmitting driving force from a driving source to a driven unit via the drive transmission unit even when the drive transmission unit and the driven unit are connected to each other and are turned together as described herein below.

Figure 1:
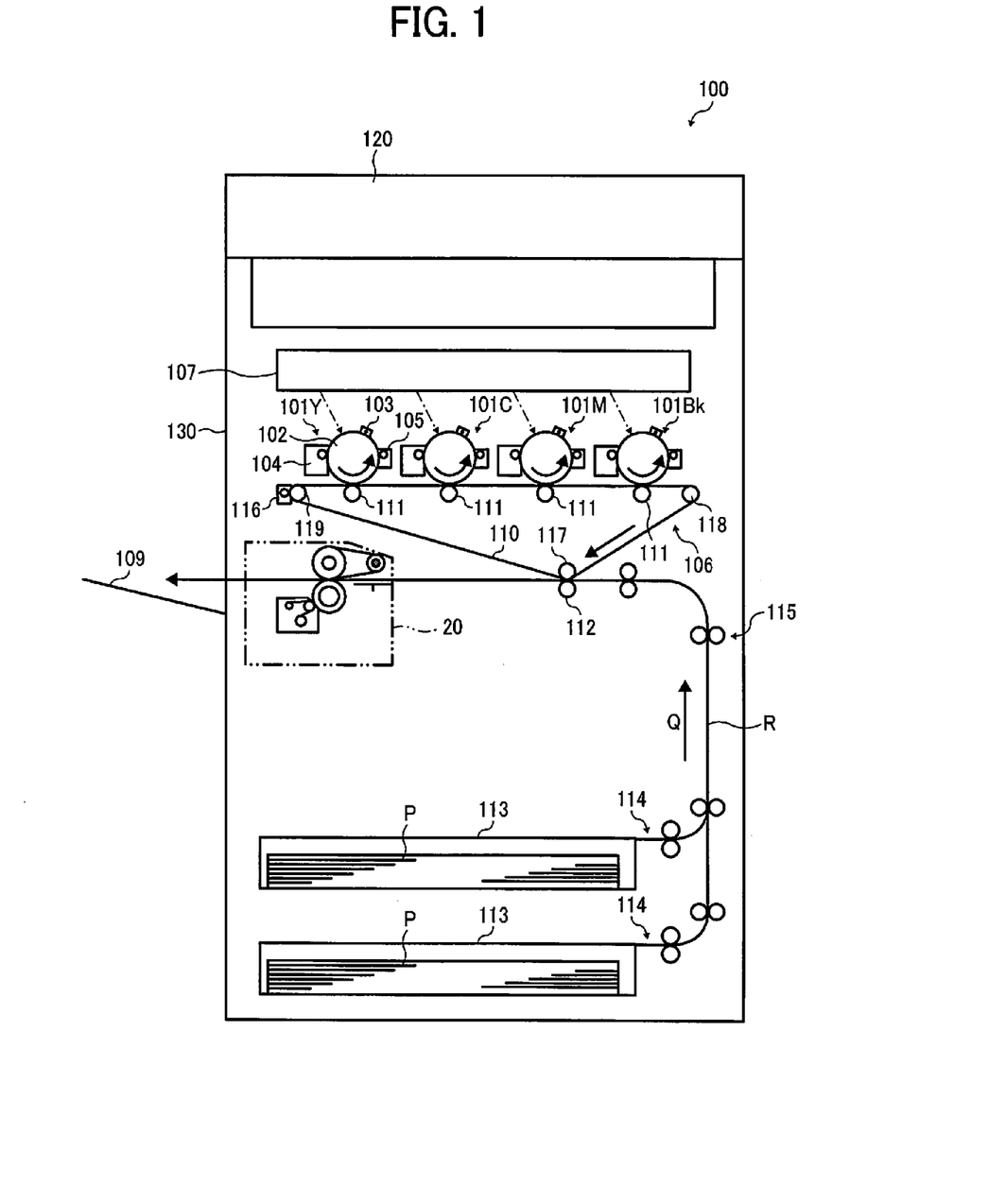
FIG. 1 is a cross-sectional view illustrating an exemplary configuration of an image forming apparatus according to one embodiment of the present invention.

Referring now to the drawings, wherein like reference numerals designate identical or corresponding member throughout the several views thereof, and in particular to FIG. 1, an exemplary fundamental configuration of an image forming apparatus 100 is initially described. That is, FIG. 1 is a diagram schematically illustrating an exemplary configuration of the image forming apparatus 100 according to one embodiment of the present invention. As shown there, the image forming apparatus 100 includes four process units 101Y, 101C, 101M, and 101Bk as image forming devices configured to be detachably attached to a main body 130 of the image forming apparatus 100. These process units 101Y, 101C, 101M, and 101Bk are similarly configured to each other, except for stored toner having different component colors form each other, such as yellow, cyan, magenta, and black, etc., respectively, corresponding to color separation components of a color image. Hence, an exemplary configuration of the process unit 101Y is herein below typically described in detail.

The process unit 101Y includes a photoconductor 102, an electric charging unit 103 that electrically charges a surface of the photoconductor 102, and an developing device 104 that visualizes a latent image to be a toner image on the surface of the photoconductor 102. The process unit 101Y also includes a photoconductor cleaner 105 that cleans the surface of the photoconductor 102 by removing toner residue remaining on the surface thereof.

Above the process unit 101Y, an exposing device 107 is provided as an exposure to expose the surface of the photoconductor 102 to optical light emitted from a light source. By contrast, below each of the process units 101Y to 101Bk, an intermediate transfer unit 106 is placed to extend over these process units 101Y to 101Bk. The intermediate transfer unit 106 has an endless intermediate transfer belt 110 to execute multiple intermediate transfer processes. The intermediate transfer belt 110 is stretched across multiple belt stretching rollers 117, 118, and 119 to circulate in a direction as shown by an arrow in a drawing of FIG. 1. On the left of the intermediate transfer belt 110 in the drawing, a belt cleaning unit 116 is placed to clean a surface of the intermediate transfer belt 110 after the intermediate transfer processes are completed.

On an inner circumferential surface of in the intermediate transfer belt 110, four primary transfer rollers 111 are placed to act as primary transfer devices, respectively. The photoconductors 102 of the respective process units 101Y, 101C, 101M, and 101Bk contact an outer circumferential surface of the intermediate transfer belt 110 at positions opposite the four primary transfer rollers 111 to form primary transfer nips therebetween, respectively. At a position opposite one of the belt stretching rollers 117 that stretches the intermediate transfer belt 110 thereon, a secondary transfer roller 112 is placed as a secondary transfer device. The secondary transfer roller 112 contacts the outer circumferential surface of the intermediate transfer belt 110 thereby forming a secondary transfer nip therebetween to execute a secondary transfer process.

At the bottom of the main body 130 of the image forming apparatus 100, multiple sheet feeding cassettes 113 each accommodating recording medium P such as recording sheets, etc., are vertically placed. In each of the sheet feeding cassettes 113, a sheet feeding roller 114 or the like is placed to contact and feed the recording medium P therefrom. In the main body 130 of the image forming apparatus 100, a sheet conveyance path R is placed as a recording medium conveyor to guide and convey the recording medium P downstream in a direction Q. On the sheet conveyance path R, a pair of registration rollers 115 is placed upstream of the secondary transfer roller 112 in the direction Q to count timing and refeed the recording medium P after temporarily stopping thereof.

Further, an exemplary fixing device 30 of one embodiment of the present invention is placed downstream of the secondary transfer roller 112 in the direction Q to fix a toner image previously transferred during the secondary transfer process onto the recording medium P. Although the cleaning unit for the fixing device of FIG. 1 acts as a driven unit driven by a drive transmission unit as described later in detail according to one embodiment of the present invention, the driven unit is not limited to the cleaning unit.

On a left side surface of the main body 130 of the image forming apparatus 100 in the drawing, a recording medium ejection tray 109 is placed to stack the recording medium P thereon when the recording medium P is ejected by a common sheet ejecting device (i.e., a recording medium ejector) from the main body 130 to an outside thereof. At the top of the main body 130 of the image forming apparatus 100, an original document reader 120 is placed to read an original document thereby acquiring image data therefrom.

Now, a fundamental operation executed in the main body 130 of the image forming apparatus 100 is herein below described in detail with reference to FIG. 1 and applicable drawings. When the image forming apparatus 100 starts image forming operation, a common drive system rotates and drives the photoconductors 102 of the respective process units 101Y, 101C, 101M, and 101Bk counterclockwise in the drawing. The electric charging units 103 then electrically charge the surfaces of the respective photoconductors 102, uniformly, in prescribed polarities. The exposing device 107 subsequently irradiates the electrically charged surfaces of the respective photoconductors 102 with laser beams to form electrostatic latent images on the surfaces of the photoconductors 102.

Here, image information used in exposing the photoconductors 102 with the laser beams are monochromatic component colors of yellow, cyan, magenta, and black, respectively obtained by separating desired full-color image information thereinto. Subsequently, by supplying the electrostatic latent images formed on the surfaces of the photoconductors 102 with toner particles from the respective developing devices 104, the electrostatic latent images are rendered visible to be toner images, respectively.

Meanwhile, to each of the primary transfer rollers 111, a voltage subjected to constant current or voltage control and having a reverse polarity to a polarity of an electric charge of toner is applied. With this, multiple electric transfer fields are formed at the primary transfer nips formed between the primary transfer rollers 111 and the photoconductors 102, respectively. Subsequently, the toner images of respective component colors formed on the photoconductors 102 of the process units 101Y, 101C, 101M, and 101Bk are transferred and superimposed successively on the intermediate transfer belt 110 under influence of the electric transfer fields formed at the above-described primary transfer nips, respectively. In this way, as the toner images of respective component colors are transferred one after another onto the intermediate transfer belt 110, a full-color toner image is formed thereon.

Residual toner adhering to the surfaces of the photoconductors 102 are removed by respective photoconductor cleaners 105 when the toner images have been transferred. An electrically charged condition of the surface (i.e., a surface potential) of each of the photoconductors 102 is cancelled by a common electric charge remover to initialize the surface thereof thereby preparing for the next image formation.

Meanwhile, the sheet feeding roller 114 feeds and launches a recording medium P from one of the multiple sheet feeding cassettes 113 to the sheet conveyance path R. The pair of registration rollers 115 then counts timing for conveying downstream the recording medium P after it is launched into the sheet conveyance path R and temporarily stopped there toward the secondary transfer nip formed between the send secondary transfer roller 112 and corresponding one of the belt stretching rollers 117. At this moment, a transfer voltage having a reverse polarity to a polarity of the electric charge of the toner of the toner image borne on the intermediate transfer belt 110 is applied again to the secondary transfer roller 112 thereby forming an electric transfer field in the secondary transfer nip.

Hence, the toner image borne on the intermediate transfer belt 110 is transferred onto the recording medium P at once by the electric transfer field formed in the secondary transfer nip. Subsequently, the belt cleaning unit 116 removes toner residue remaining on the surface of the intermediate transfer belt 110 after the full-color image is transferred therefrom. The recording medium P bearing the full-color image transferred thereonto is further conveyed downstream to the fixing device 30. The toner image is subsequently fixed onto the recording medium P by heat and pressure applied thereto by the fixing device 30. After that, the recording medium P is ejected from the main body 130 onto the recording medium ejection tray 109 from the fixing device 30. Hence, an image formation process of forming the full-color image on the record medium P is completed.

Although the above-described operation is only to form the full-color image on the recording medium P, a monochromatic image can be also formed by using any one of the four process units 101Y, 101C, 101M, and 101Bk with the four different component color toner particles as well. Further, dual or trivalent component color images can also be formed by selectively using two or three process units among the four process units 101Y, 101C, 101M, and 101Bk as well.

Figure 2:
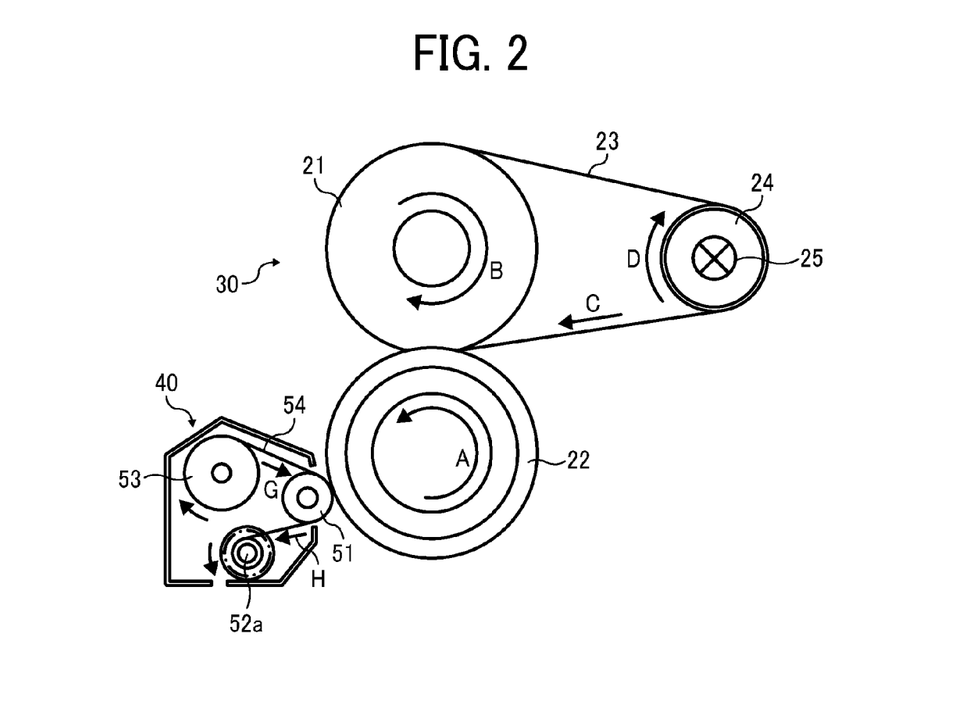
FIG. 2 is a diagram schematically illustrating a first exemplary fixing device included in the image forming apparatus according to one embodiment of the present invention.

Now, various embodiments and modifications of the fixing device 30 are herein below described in greater detail with reference to FIGS. 2 and 9. As shown in FIG. 2, one example of a fixing unit 20 includes a fixing device 30 that fixes the toner image onto the recording medium P passing therethrough and a cleaning unit 40 that removes residual toner remaining on one of fixing and pressing rollers included in the fixing device 30 after the toner image has been fixed thereon. Another example of the fixing unit 20 as described later in more detail with reference to FIG. 7 includes the fixing device 30 that fixes the toner image onto the recording medium P and a polishing unit 41 that recovers a prescribed preferable surface condition of an outer surface of the fixing belt 23 by polishing thereof. In these examples, the cleaning unit 40 and the polishing unit 41 are connected to and driven by drive transmission units, respectively, as described later in greater detail.

Figure 3:
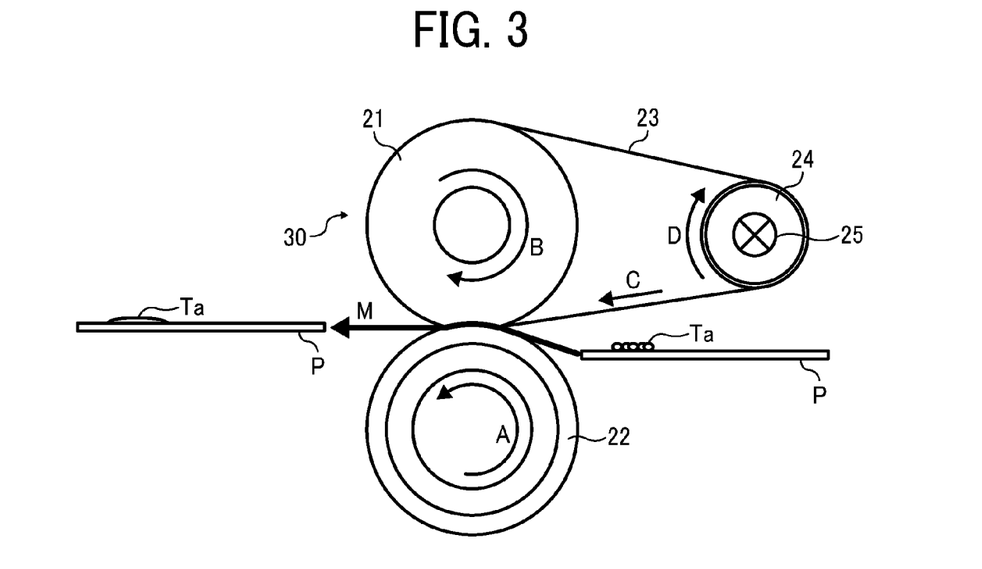
FIG. 3 is a diagram schematically illustrating exemplary fixing operation in which an unfixed toner image is fixed by the fixing device of the image forming apparatus according to one embodiment of the present invention.

Initially, the former example of the fixing device 30 is described with reference to FIGS. 2 and 3. FIG. 3 is a diagram schematically illustrating the fixing device 30 included in the fixing device 30 of FIG. 2 and a fixing process executed in the fixing device 30. The fixing device 30 includes an endless fixing belt 23, a heating roller 24, and a fixing roller 21 collectively acting as a belt holder to stretch and hold the endless fixing belt 23 therebetween. That is, the fixing belt 23 is wound around the fixing roller 21 and the heating roller 24. However, three or more rollers may be also employed to stretch and hold the fixing belt 23 therebetween. The pressing roller 22 acting as a pressing member contacts an outer surface of the fixing belt 23 in a contact area in which the fixing belt 23 contacts the fixing roller 21. The pressing roller 22 is pressed by a prescribed common bias member against the fixing belt 23.

The pressing roller 22 is driven and rotated by a common driving source, such as a motor, etc., in a direction as shown by arrow A. Rotation of the pressing roller 22 is conveyed through a common gear rain or the like to rotate the fixing roller 21 at the same time in a direction as shown by arrow B. Due to rotation of the fixing roller 21, since the fixing belt 23 travels in a direction as shown by arrow C, the heating roller 24 is thereby driven and rotated in a direction as shown by arrow D at the same time. Here, instead of the pressing roller 22, a pressing belt can be alternatively employed as a pressing member to press the fixing belt 23 against the fixing roller 21. The heating roller 24 is a hollow type capable of accommodating a heater 25 therein. Hence, the heater 25 heats the heating roller 24 and accordingly the fixing belt 23 as well. The fixing roller 21 can also be a hollow type capable of accommodating a heater therein to heat the fixing roller 21 as well.

It is preferable to place temperature sensors at positions at which the fixing belt 23 contacts the heating roller 24, the fixing roller 21, and the pressing roller 22 to control electric supply to the heater 25 based on temperatures detected at the respective positions. Here, temperature of each of the fixing belt 23 and the pressing roller 22 is controlled by a common temperature controller to be optimized to fix a toner layer of the toner image.

As shown in FIG. 3, when the recording medium P is conveyed in a direction as shown by arrow M into a nip formed between the fixing roller 21 and the pressing roller 22 across the fixing belt 23 with an unfixed toner image (Ta) transferred thereonto, the toner image (Tb) is fixed onto the recording medium P by heat and pressure applied thereto when passing through the nip.

Now, an exemplary cleaning unit to clean the fixing device 30 is described with reference to FIG. 2 and applicable drawings. As shown in FIG. 2, the cleaning unit 40 at least includes a cleaning web 54 that wipes off dirt, dust, and toner residue or the like from the surface of pressing roller 22 acting as the pressing member that constitutes the fixing device, a web feed roller 53 that feeds the cleaning web 54 forward, and a cleaning roller 51 that brings the cleaning web 54 in contact with the pressing roller 22. The cleaning unit 40 also includes a cleaning web reel roller 52a that takes it up and collects the cleaning web 54. The cleaning unit 40 moves to follow the pressing roller 22 as the pressing roller 22 moves in a prescribed direction, for example, for the purpose of positional adjustment, such as adjustment of contact pressure thereof against the fixing roller 21, etc.

After it has wiped off the residual toner from the pressing roller 22 by contacting the pressing roller 22, the cleaning web 54 is taken up and collected by the cleaning web reel roller 52a in a direction as shown by arrow H in the drawing. As a result, since the cleaning web 54 is drawn from the web feed roller 53, the web feed roller 53 is driven and rotated by the web, so that a fresh portion (i.e., an unused portion) of the cleaning web 54 is launched therefrom in a direction as shown by arrow G. Subsequently, the fresh portion of the cleaning web 54 pulled out from the web feed roller 53 in this way is further conveyed and reaches a contact area at which the cleaning roller 51 and the pressing roller 22 contact each other. The fresh portion of the cleaning web 54 subsequently cleans the pressing roller 22.

Figure 7:
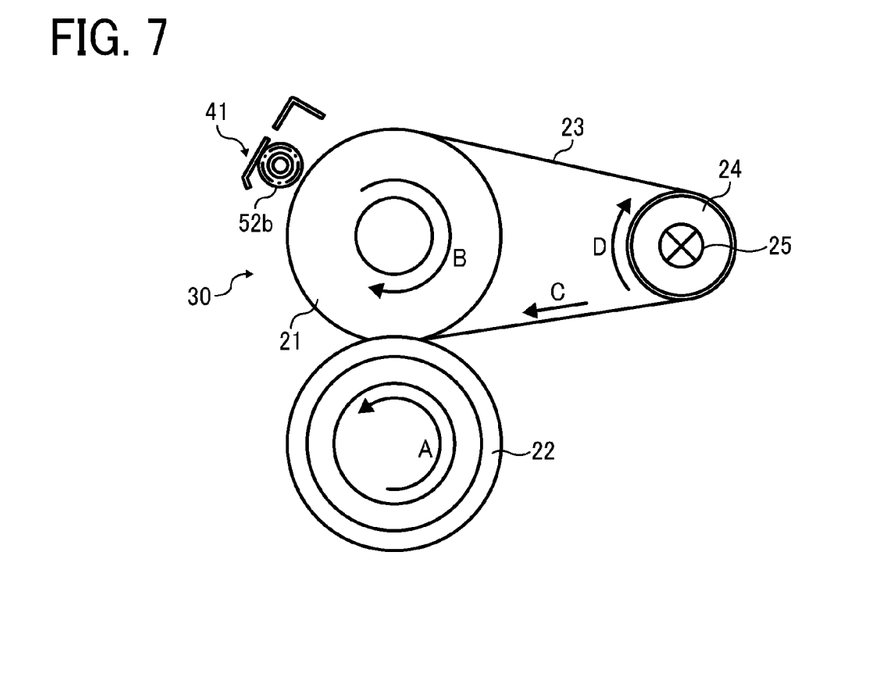
FIG. 7 is a diagram schematically illustrating another exemplary fixing member to be included in the fixing device of FIG. 1, to which another exemplary drive transmission unit and a driven unit is applied according to another embodiment of the present invention.

Now, an exemplary polishing unit 41 is described with reference to FIG. 7. The polishing unit 41 is a device that recovers prescribed surface performance of the fixing member (i.e., the fixing belt 23) that constitutes the fixing device by polishing an outer surface thereof as shown in FIG. 7. The polishing unit 41 at least includes a polishing roller 52b capable of engaging and disengaging from the fixing belt 23.

When it is engaged therewith, the polishing roller 52b slides on the surface of the fixing belt 23 at a prescribed rotational peripheral speed different from that of the fixing belt 23 by a prescribed amount to effectively polish and recover the prescribed surface performance of the fixing belt 23.

Figure 9:
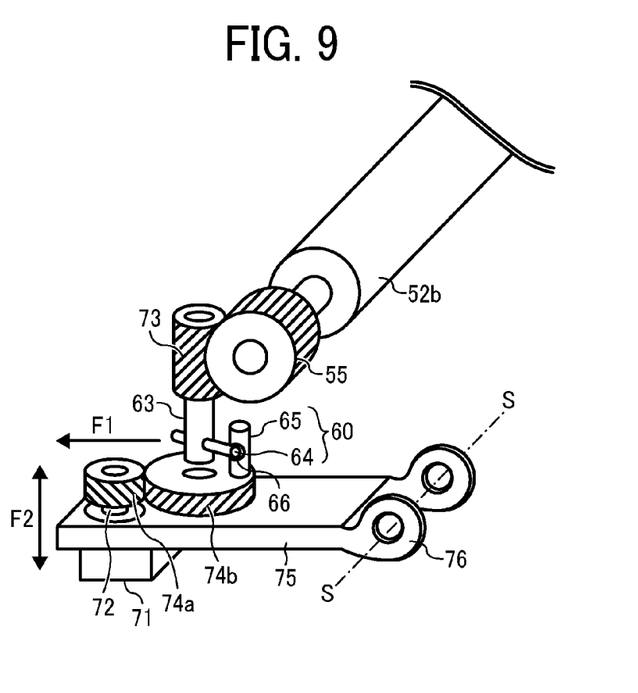
FIG. 9 is a perspective view illustrating the exemplary drive transmission unit and the driven unit as collectively illustrated in FIGS. 8A and 8B.

Now, various exemplary drive transmission units according to several embodiments of the present invention are herein below described with reference to FIGS. 4A to 6 and applicable drawings. In any of these embodiments of the present invention, the drive transmission unit at least includes a driving source, a drive transmission member, and a basal plate having a turning shaft portion acting as a pivot (i.e., a turning center) and a unit coupler engaging with a driven unit. The driven unit includes a driven rotator acting as a driving target for the drive transmission unit and is turned together with the drive transmission unit engaging with the unit coupler when the drive transmission unit is turned around the turning shaft portion. A turning direction of the drive transmission unit is orthogonal to a direction of a driving reaction force arising when the driven rotator is driven by the drive transmission member as shown in FIGS. 6 and 9.

Figure 4A:
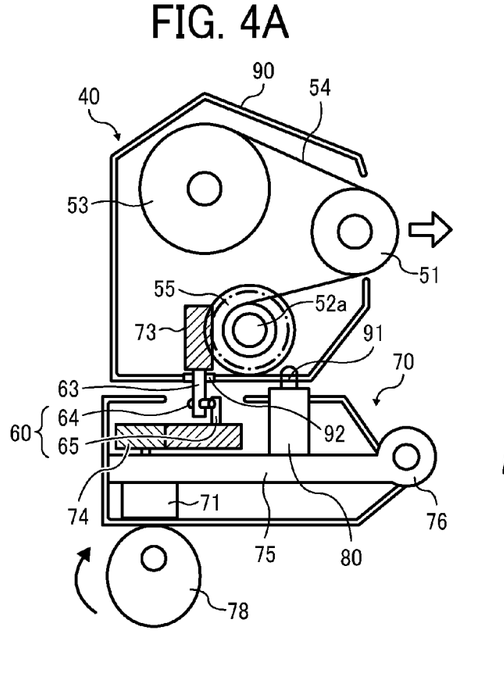
FIGS. 4A and 4B are schematic diagrams collectively illustrating an exemplary aspect of a first exemplary drive transmission unit and a driven unit when the driven unit is a cleaning unit and these units are turned together in the fixing device of FIG. 2 in a prescribed direction according to one embodiment of the present invention.
Figure 4B:
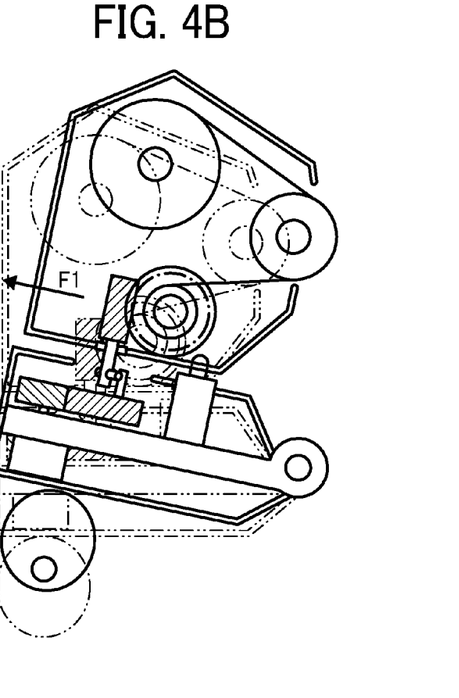

Initially, according to a first embodiment of the present invention, a first exemplary drive transmission unit that drives the cleaning unit 40 acting as the driven unit is described in greater detail with reference to FIGS. 4A to 5. As shown in FIGS. 4A and 4B, a drive transmission unit 70 at least includes a driving source 71, a drive transmission member 73 connected to the driving source 71 to transmit driving force to the cleaning unit 40 as the driven unit, and a basal plate 75 having a turning shaft portion 76 acting as a pivot (i.e., a turning center) at its one end. The basal plate 75 also includes a unit coupler 80 having a positioning pin at its top fitting into an engaging hole 91 formed on a bottom surface of an exterior cover 90 of the cleaning unit 40. Hence, the cleaning unit 40 is relatively positioned and is turned around the turning shaft portion 76 together with drive transmission unit 70. That is, the cleaning unit 40 as the driven unit includes the exterior cover 90 to cover the web feed roller 53, the cleaning roller 51, and the cleaning web reel roller 52a. The cleaning unit 40 also includes the cleaning web 54 and the like. In addition to the engaging hole 91, the exterior cover 90 also includes a shaft bearing 92 to rotatably hold the rotary shaft 63 of the drive transmission member 73 as well.

Accordingly, the drive transmission unit 70 is turned around the turning shaft portion 76 together with the cleaning unit 40 (i.e., the cleaning web reel roller 52a acting as the driven rotator as the driving target). The drive transmission unit 70 is detachably attached to the cleaning unit 40 via the unit coupler 80 and is enabled to move and follow the pressing roller 22 of the fixing device together with the cleaning unit 40 when the pressing roller 22 moves, for example, for the purpose of adjustment of its own position or contact pressure thereof against the fixing roller 21 and the like.

The drive transmission unit 70 includes a cam 78 that engages a bottom surface of a housing and rotates in a prescribed direction to act as a turning device to turn the drive transmission unit 70 around the turning shaft portion 76 (i.e., a turning axis S) together with the cleaning unit 40. Since the drive transmission unit 70 moves around the same pivot (i.e., the turning axis S) as the cleaning unit 40 acting as the driven unit, a driving connection condition of these devices can be maintained to be stable.

Figure 5:
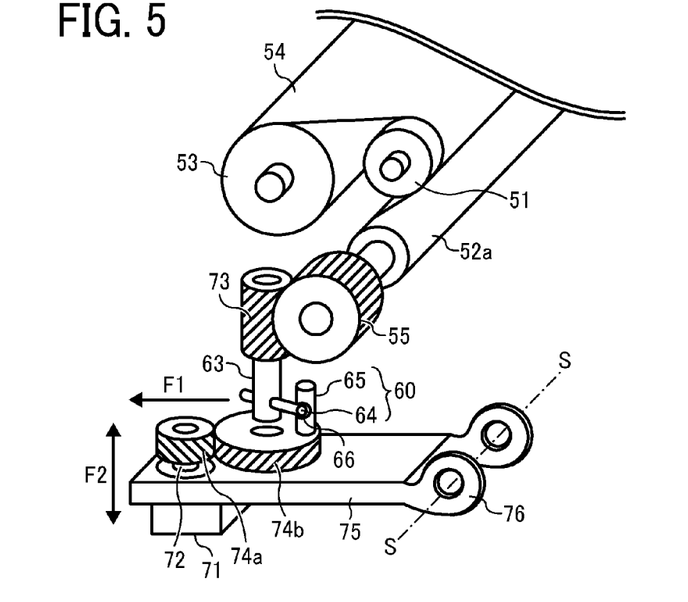
FIG. 5 is a perspective view illustrating the first exemplary drive transmission unit and driven unit collectively illustrated in FIGS. 4A and 4B.
Figure 6:
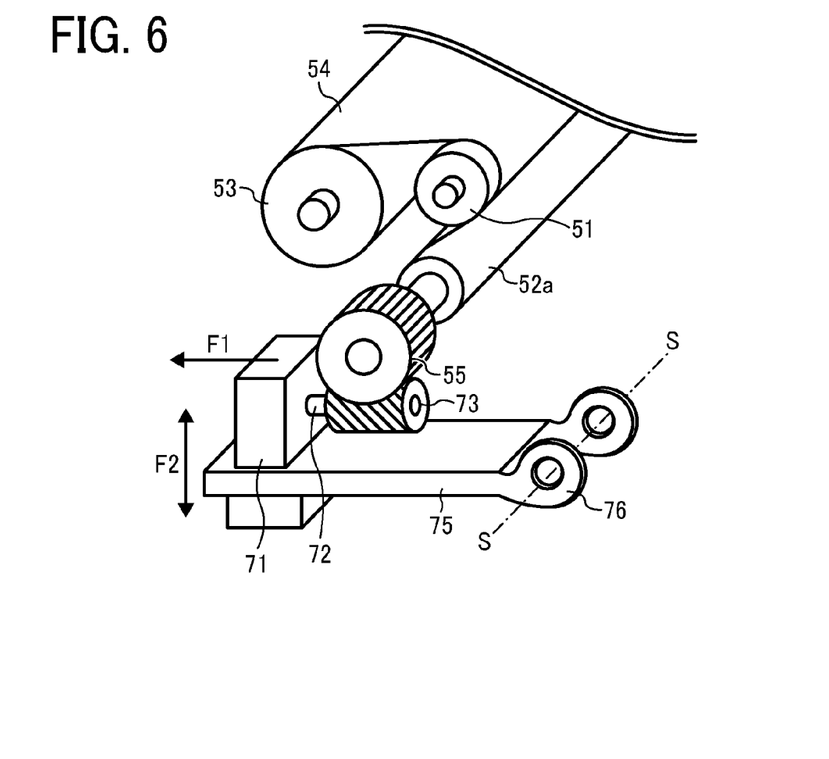
FIG. 6 is a perspective view illustrating an exemplary drive transmission unit and a driven unit as a modification of those of FIGS. 4A and 4B according to one embodiment of the present invention.

Further, as shown in FIG. 5, in this embodiment of the present invention, a turning direction F2 of the drive transmission unit 70 is rendered to be almost orthogonal to a direction F1 of a driving reaction force caused when the driven rotator (i.e., the cleaning web reel roller 52a) is driven by the drive transmission unit 70. Here, the turning direction F2 of the drive transmission unit 70 can be represented by a direction of a tangent to a rotational locus of the drive transmission unit 70. That is, by rendering the turning direction F2 of the drive transmission unit 70 to be almost orthogonal to the direction F1 of the driving reaction force caused by drive transmission when driving force is transmitted, the driving reaction force applied to the drive transmission member 73 can be counterbalanced, thereby capable of effectively stabilizing transmission of driving force. In this embodiment of the present invention, the drive transmission unit 70 includes a joint mechanism 60 (i.e., 64 and 65) that transmits the driving force from the driving source 71 to the drive transmission member 73.

The cleaning web reel roller 52a acting as the driven rotator coaxially includes a spur gear 55 on its rotary shaft at its one end, and is driven and rotated by the driving source 71 via the drive transmission member 73 engaging the spur gear 55. The joint mechanism 60 includes a first pin 64 mounted on the rotary shaft 63 and extending therefrom. The joint mechanism 60 also includes a second pin 65 mounted on a side surface (i.e., an upper surface in the drawing) of a helical gear 74b rotated by the driving source 71. The second pin 65 includes a recess 66 on its outer surface to fit with the first pin 64. That is, since the first pin 64 mates with the recess 66 of the second pin 65, rotation of the driving source 71 is transmitted to the drive transmission member 73 via a driving shaft 72 and multiple helical gears 74a and 74b (74 in FIG. 4) as well. Hence, the first and second pins 64 and 65 of the joint mechanism 60 do not disengage from each other and continuously transmit driving force precisely from the driving source 71 to the rotary shaft 63 of the worm gear 73 even when the cleaning unit 40 is turned around the turning shaft portion 76. Further, since rotary axis of the drive transmission member 73 is substantially coaxial with a rotary axis of the joint mechanism 60 (i.e., a rotary axis of the helical gear 74b), positional misalignment and backlash of the rotary shaft 63 of the drive transmission member 73, which is generally caused during installation thereof, can be tolerated.

Now, an exemplary modification of the drive transmission unit 70 of the first embodiment of the present invention is herein below described in greater detail with reference to FIG. 6. As shown in FIG. 6, the drive transmission unit 70 of the modification of the first embodiment of the present invention at least includes the driving source 71, the drive transmission member 73 horizontally extended, and the basal plate 75 supporting the driving source 71 on its upper surface and having a turning shaft portion 76 at its one end again. As in the first embodiment of the present invention, the drive transmission unit 70 is turned together with the driven unit (i.e., the cleaning unit 40) that includes the cleaning web reel roller 52a acting as the driven rotator as the driving target therefor. The drive transmission unit 70 is again configured to move and follow the pressing roller 22 of the fixing device, and is detachably attached to the cleaning unit 40 as well. In addition, as in the first embodiment of the present invention, the drive transmission unit 70 is detachably attached to the driven unit (i.e., the cleaning unit 40). The drive transmission unit 70 again includes the cam 78 engaging a bottom surface of the housing and is turned around the turning shaft portion 76 (i.e., the turning axis S) together with the driven unit as the cam 78 rotates in the prescribed direction. Since the drive transmission unit 70 moves regarding the same pivot as the cleaning unit 40 acting as the driven unit, a driving connection condition of these units and devices can be maintained to be stable.

That is, as shown in FIG. 6, a turning direction F2 (i.e., a direction tangential to a rotational locus) of the drive transmission unit 70 is again almost orthogonal to the direction F1 of the driving reaction force caused when the driven rotator (i.e., the cleaning web reel roller 52a) is driven by the drive transmission member 73 in this embodiment of the present invention. Hence, since the driving reaction force caused in a driving force transmitting section and applied to the drive transmission member 73 can be counterbalanced, thereby capable of effectively stabilizing driving force transmission.

Here, in the drive transmission unit 70 of this modification of the first embodiment of the present invention, the driving shaft 72 of the drive transmission member 73 is twisted on a horizontal plane from that of the driven rotator (i.e., the cleaning web reel roller 52a). That is, these rotary axes are not parallel and do not intersect with each other. Hence, since the driven rotator (i.e., the cleaning web reel roller 52a) coaxially includes the spur gear 55 at its one end again, the drive transmission member 73 accordingly employ the worm gear to transmit the driving force from the driving source 71 to the driven unit.

Further, a pressing direction of the cleaning roller 51 of the cleaning unit 40 pressing the web 54 against the pressing roller 22 of the fixing device 30 is parallel with the driving shaft 72 of the drive transmission member 73. For this reason, the driving force transmission in this modification can be more stable than in the first embodiment of the present invention.

Now, a second embodiment of the present invention is now described with reference to FIGS. 7 to 10 and applicable drawings. When the recording medium P is repeatedly conveyed through a fixing member, such as a fixing roller, a fixing belt, etc., cut and stain, such as sheet dust, offset toner, etc., are generated thereby gradually roughening a surface of the fixing member. Especially, when the recording medium P having the same size is continuously conveyed through the fixing member, both ends of the recording medium P serving as burrs tend to roughen and damage corresponding portions of the surface of the fixing member. As a result, such stain and roughness caused on the surface of the fixing member cause a shiny stripe and unevenness in a toner image borne on the recording medium P, thereby degrading image quality sometimes.

To prevent such degradation of image quality, a known technology makes a surface of the fixing member of the fixing device uniform by using a prescribed slider that slides along and smooths the surface of the fixing member thereby suppressing occurrence of an abnormal image, such as a shiny stripe, etc., on the recording medium P. Specifically, the known technology employs a polishing unit including a polling roller to polish the surface of a fixing belt acting as the fixing member of the fixing device to recover prescribed surface uniformity of the fixing belt. The polishing roller is generally controlled to engage and disengage from the fixing belt to maintain polishing property of it for a long time, thereby preventing a short life of the polishing roller.

Hence, the polishing roller is driven by an external drive system (i.e., a drive transmission unit) to engage the surface of the fixing belt and rotate at a different peripheral speed from that of the fixing belt, for example. That is, the polishing roller engages with and disengages from the fixing belt by its turning movement. At this moment, the external drive system coupled to the polishing unit follows the polishing unit by its turning movement. When a direction of a driving reaction force caused in association with transmission of driving force to the polishing roller is the same as a direction of the turning movement of the polishing unit (i.e., a direction of the turning movement of the external drive system), since a prescribed amount of force is applied to the external drive system in a direction to separate the polishing roller acting as a driven unit from the external drive system engaged therewith, transmission of the driving force becomes unstable thereby possibly deteriorating polishing performance thereof.

Hence, as described herein below with reference to FIGS. 7 to 10, a second embodiment of the present invention provides a drive force transmitting unit capable of precisely transmitting driving force to a driven unit (i.e., a polishing roller) even when the drive transmission unit and the driven unit connected thereto are turned together.

Figure 8A:
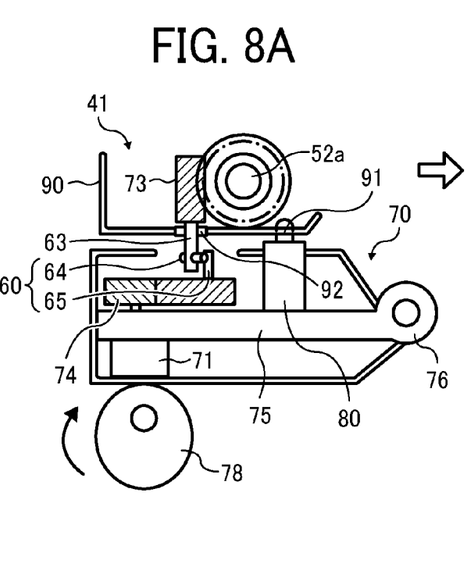
FIGS. 8A and 8B are schematic diagrams collectively illustrating an exemplary aspect of a second exemplary drive transmission unit and a driven unit when the driven unit is a polishing unit and these units are turned together in the fixing device of FIG. 7 in a prescribed direction according to another embodiment of the present invention.
Figure 8B:
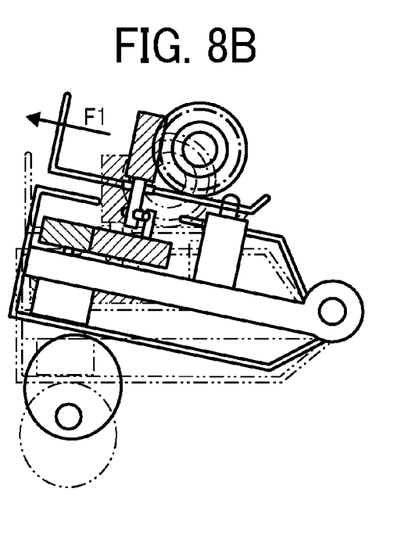

That is, as collectively illustrated in FIGS. 8A to 9, an exemplary drive transmission unit of a second embodiment of the present invention includes a polishing unit that serves as the driven unit and polishes a fixing member. As shown in FIGS. 8A and 8B, the drive transmission unit 70 at least includes the driving source 71, the drive transmission member 73 connected to the driving source to transmit driving force to the driven unit, and the basal plate 75 having the turning shaft portion 76 acting as the pivot at its one end as in the first embodiment of the present invention and the modification thereof. The drive transmission unit 70 is turned together with the driven unit (i.e., the polishing unit 41) having a driven rotator (e.g., the polishing roller 52b). The drive transmission unit 70 is configured to bring the polishing roller 52b in contact with and separate it from the fixing belt 23 by its turning movement around the turning shaft portion 76 (i.e., the turning axis S). The drive transmission unit 70 is detachably attached to the polishing unit 41 again.

The drive transmission unit 70 also includes the cam 78 engaging a bottom surface of the housing thereof and is turned around the turning shaft portion 76 (i.e., the turning axis S) together with the driven unit as the cam 78 rotates in the prescribed direction as in the first embodiment of the present invention and the modification thereof. Since the drive transmission unit 70 moves around the same pivot (i.e., the turning axis S) as the polishing unit 41 acting as the driven unit, a driving force connection condition of these devices can be maintained to be stable again as in the first embodiment of the present invention and the modification thereof.

Further, as shown in FIG. 9, as in the first embodiment and the modification thereof of the present invention, the turning direction F2 of the drive transmission unit 70 is almost orthogonal again to the direction F1 of the driving reaction force caused when the driven rotator (i.e., the polishing roller 52b) is driven by the drive transmission unit 70 (i.e., the drive transmission member 73). Here, the turning direction F2 can be again represented by a direction of a tangent to a rotational locus of the drive transmission unit 70. Hence, by rendering the turning direction F2 of the drive transmission unit 70 to be almost orthogonal to the direction F1 of the driving reaction force caused by driving force transmission, the reaction force applied to a driving force transmitting section of the drive transmission member 73 can be counterbalanced, thereby stabilizing the driving force transmission again as in the first embodiment of the present invention and the modification thereof.

That is, in this embodiment of the present invention, the drive transmission unit 70 includes the joint mechanism 60 that transmits driving force from the driving source 71 to the drive transmission member 73. The rotary axis of the drive transmission member 73 is substantially coaxial with a rotary axis of the joint mechanism 60 (i.e., 64 and 65). The polishing roller 52b acting as the driven rotator coaxially includes the spur gear 55, and is driven and rotated by the driving source 71 via the drive transmission member 73 engaging the spur gear 55 again. The joint mechanism 60 is composed of the first pin 64 mounted on a rotary shaft 63 of the drive transmission member 73, and laterally extending therefrom and the second pin 65 mounted on a side surface (i.e., an upper surface in the drawing) of a helical gear 74b rotated by the driving source 71 while having the recess 66 fitting with the first pin 64 as in the above-described embodiment of the present invention. Hence, since the first pin 64 mates with the recess 66 of the second pin 65, rotation of the driving source 71 is transmitted to the drive transmission member 73 via the driving shaft 72 and the multiple helical gears 74a and 74b again.

Now, another exemplary drive transmission unit as a modification of the second embodiment of the present invention is herein below described in greater detail with reference to FIG. 10. As in the first embodiment of the present invention, the drive transmission unit 70 is detachably attached to the driven unit (i.e., the polishing unit 41) and includes the cam 78 engaging the bottom surface of the housing thereof. The drive transmission unit 70 is turned around the turning shaft portion 76 (i.e., the turning axis S) together with the driven unit again as the cam 78 rotates. Since the drive transmission unit 70 moves around the same pivot as the polishing unit 41 acting as the driven unit, the driving connection condition of these devices can be maintained to be stable again.

Figure 10:
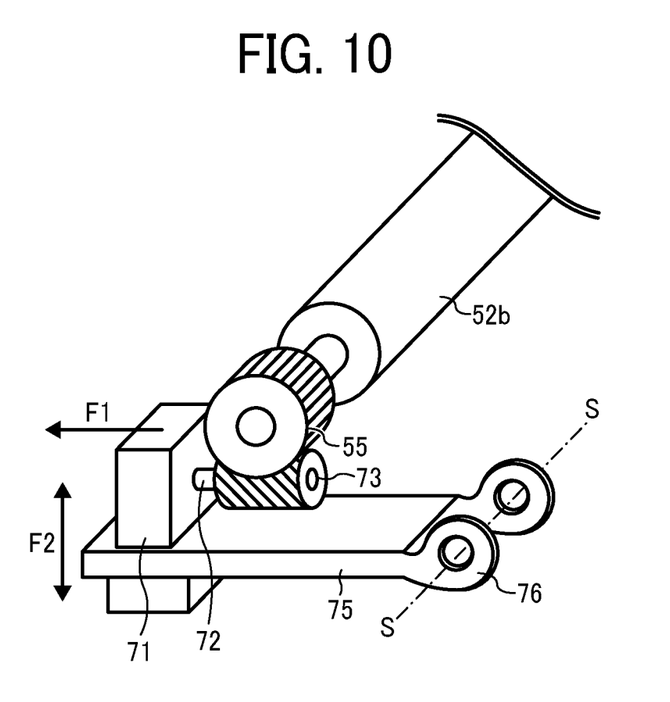
FIG. 10 is also a perspective view illustrating an exemplary drive transmission unit and a driven unit as a modification of those of FIGS. 8A and 8B according to anther embodiment of the present invention.

That is, as shown in FIG. 10, in this modification of the second embodiment of the present invention, the turning direction F2 of the drive transmission unit 70 is almost orthogonal again to the direction F1 of the driving reaction force caused when the driven rotator (i.e., the polishing roller 52b) is driven by the drive transmission unit 70 (i.e., the drive transmission member 73). Hence, since the driving reaction force applied to the driving force transmitting section of the drive transmission member 73 from the spur gear can be counterbalanced, thereby stabilizing the driving force transmission again.

That is, as shown in FIG. 10, the drive transmission unit 70 at least includes the driving source 71, the drive transmission member 73 connected to the driving source to transmit driving force to the driven unit and extended laterally, and the basal plate 75 supporting the driving source 71 and the drive transmission member 73 thereon with the turning shaft portion 76 at its one end. The drive transmission unit 70 is turned together with the driven unit (i.e., the polishing unit 41) that includes the polishing roller 52b acting as the driven rotator as the driving target therefor. The drive transmission unit 70 is configured to move to follow the pressing roller 22 of the fixing device, and detachably attached to the polishing unit 41. The drive transmission unit 70 includes the cam 78 engaging the bottom surface of the housing thereof and is turned around the turning shaft portion 76 (i.e., the axis S of the turning shaft) together with the driven unit as the cam 78 rotates. Again, in the drive transmission unit 70 of this modification of the second embodiment of the present invention, the rotary axis of the driving shaft 72 of the drive transmission member 73 is twisted on the horizontal plane from that of the driven rotator (i.e., the polishing roller 52b) as in the above described first and second embodiments of the present invention and the modification of the first embodiment. Hence, the worm gear is accordingly employed as the drive transmission member 73, and the spur gear 55 is coaxially attached to the polishing roller 52b at its one end again.

As described earlier, when the direction of the driving reaction force generated in association with the driving force transmission from the driving source is the same as the direction of the turning movement of the drive transmission unit, since a given force is applied in a direction to separate driving engagement of those devices, the driving force transmission likely becomes unstable. However, according to the above-described various embodiments of the present invention and the modifications thereof, since the turning direction of the drive transmission unit is determined considering the direction of it to counterbalance (or effectively block) the reaction force applied thereto, driving connection and transmission can be stable.

That is, according to one aspect of the present invention, a drive force transmitting unit can precisely transmit driving force to a driven unit connected thereto via a unit coupler even when the drive transmission unit and the driven unit are turned together around a turning shaft portion. That is, a drive transmission unit that transmits driving force to a driven unit including a driven rotator coupled to the drive transmission unit. The drive transmission unit includes a driving source, a drive transmission member that engages the driven rotator to transmit driving force from the driving source to the driven rotator, and a basal plate with a turning shaft portion at one end thereof. The basal plate supports the driving source and the drive transmission member thereon. The drive transmission unit is turned around the turning shaft portion together with the driven unit in a direction substantially orthogonal to a direction of a driving reaction force applied to the drive transmission member when the driven rotator receives the driving force from the drive transmission member.

According to another aspect of the present invention, a drive force transmitting unit can more precisely transmit driving force to a driven unit even when the drive transmission unit and the driven unit connected thereto are turned together. That is, the turning device is a cam driven in a prescribed direction while contacting the bottom portion of the basal plate. The drive transmission unit is turned around the turning shaft portion together with the driven unit as the cam rotates.

According to another aspect of the present invention, a drive force transmitting unit can more precisely transmit driving force to a driven unit even when the drive transmission unit and the driven unit connected thereto are turned together. That is, a rotary joint unit is provided to transmit the driving force from the driving source to the drive transmission member. The rotary joint unit is substantially coaxially disposed on the basal plate with the drive transmission member between the driving source and the drive transmission member.

According to yet another aspect of the present invention, a drive force transmitting unit can more precisely transmit driving force to a driven unit even when the drive transmission unit and the driven unit connected thereto are turned together. That is, a rotary axis of the drive transmission member is placed on a different plane from a plane on which a rotary axis of the driven rotator is placed, so that the rotary axis of the drive transmission member and the rotary axis of the driven rotator are neither parallel to nor intersect with each other. The drive transmission member is a worm gear.

According to yet another aspect of the present invention, a drive force transmitting unit can more precisely transmit driving force to a driven unit even when the drive transmission unit and the driven unit connected thereto are turned together. That is, the driven unit is a cleaning unit to clean one of a fixing member and a pressing member pressing against the fixing member included in a fixing device. The cleaning unit includes a web to wipe off deposits from a surface of one of the fixing member and the pressing member, a web feed roller to feed the web forward, a cleaning roller to press the wed fed from the web feed roller against one of the fixing member and the pressing member, and a cleaning web reel roller driven to collect the web by taking the web up therearound. The cleaning web reel roller is the driven rotator.

According to another aspect of the present invention, a drive force transmitting unit can more precisely transmit driving force to a driven unit even when the drive transmission unit and the driven unit connected thereto are turned together. That is, the drive transmission member is disposed so that a rotary axis of the drive transmission member is parallel with a pressing direction of the cleaning roller pressed against one of the fixing member and the pressing member.

According to yet another aspect of the present invention, a drive force transmitting unit can more precisely transmit driving force to a driven unit even when the drive transmission unit and the driven unit connected thereto are turned together. That is, the driven unit is a polishing unit having a polishing roller to recover a given level of uniformity of an outer circumferential surface of a fixing member included in a fixing device by bringing the polishing roller in contact with the fixing member and polishing the outer circumferential surface thereof. The driven rotator is the polishing roller.

Numerous additional modifications and variations of the present invention are possible in light of the above teachings. It is therefore to be understood that within the scope of the appended claims, the present invention may be executed otherwise than as specifically described herein. For example, the image forming apparatus is not limited to the above-described various embodiments and modifications may be altered as appropriate. Further, the fixing unit is not limited to the above-described various embodiments and modifications may be altered as appropriate. Furthermore, the drive transmission unit is not limited to the above-described various embodiments and modifications may be again altered as appropriate as well.

What is claimed is:

1. A drive transmission unit to transmit driving force to a driven unit including a driven rotator coupled to the drive transmission unit via a unit coupler, the drive transmission unit comprising:
   a driving source;
   a drive transmission member that engages the driven rotator to transmit driving force from the driving source to the driven rotator; and
   a basal plate with a turning shaft portion at one end thereof, the basal plate supporting the driving source and the drive transmission member thereon,
   wherein the drive transmission unit is turned around the turning shaft portion together with the driven unit in a direction substantially orthogonal to a direction of a driving reaction force applied to the drive transmission member when the driven rotator receives the driving force from the drive transmission member.

2. The drive transmission unit according to claim 1, wherein the driven rotator executes an image forming process by engaging an image forming device.

3. The drive transmission unit according to claim 2, wherein the driven rotator is moved to follow the image forming device to engage the image forming device to execute the image forming process when the image forming device is displaced in accordance with a change in image formation condition.

4. The drive transmission unit according to claim 2, wherein the driven unit maintains given performance of the image forming device by engaging the image forming device during the image forming process.

5. The drive transmission unit according to claim 1, further comprising a turning device to turn the drive transmission unit and the driven unit around the turning shaft portion while contacting a bottom portion of the basal plate.

6. The drive transmission unit according to claim 5, wherein the turning device is a cam driven in a prescribed direction while contacting the bottom portion of the basal plate, wherein the drive transmission unit is turned around the turning shaft portion together with the driven unit as the cam rotates.

7. The drive transmission unit according to claim 1, further comprising a rotary joint unit to transmit the driving force from the driving source to the drive transmission member, wherein the rotary joint unit is substantially coaxially disposed on the basal plate with the drive transmission member between the driving source and the drive transmission member.

8. The drive transmission unit according to claim 7, wherein the rotary joint unit comprises:
a first pin perpendicularly projecting from a rotary shaft of the drive transmission member;
a driving force transmitting gear connected to the driving source; and
a second pin perpendicularly projecting from a side surface of the driving force transmitting gear to engage the first pin to rotate the first pin,
wherein the second pin is substantially parallel with the rotary shaft of the drive transmission member.

9. The drive transmission unit according to claim 1, wherein a rotary axis of the drive transmission member is placed on a different plane from a plane on which a rotary axis of the driven rotator is placed, so that the rotary axis of the drive transmission member and the rotary axis of the driven rotator are neither parallel to nor intersect with each other, wherein the drive transmission member is a worm gear.

10. The drive transmission unit according to claim 9, wherein the driven unit includes a coaxial spur gear meshing with the worm gear at one end thereof, wherein the worm gear receives a reaction force from the spur gear when the worm gear transmits the driving force to the spur gear.

11. The drive transmission unit according to claim 1, wherein the driven unit is a cleaning unit to clean one of a fixing member and a pressing member pressing against the fixing member included in a fixing device, the cleaning unit including:
a web to wipe off deposits from a surface of one of the fixing member and the pressing member;
a web feed roller to feed the web forward;
a cleaning roller to press the wed fed from the web feed roller against the one of the fixing member and the pressing member; and
a cleaning web reel roller driven to collect the web by taking the web up therearound,
wherein the cleaning web reel roller is the driven rotator.

12. The drive transmission unit according to claim 11, wherein the drive transmission unit is turned around the turning shaft portion together with the cleaning unit to follow one of the fixing member and the pressing member when the one of the fixing member and the pressing member is displaced to change a contacting condition therebetween.

13. The drive transmission unit according to claim 11, wherein the drive transmission member is disposed so that a rotary axis of the drive transmission member is parallel with a pressing direction of the cleaning roller pressed against the one of the fixing member and the pressing member.

14. The drive transmission unit according to claim 1, wherein the driven unit is a polishing unit having a polishing roller to recover a given level of uniformity of an outer circumferential surface of a fixing member included in a fixing device by bringing the polishing roller in contact with the fixing member and polishing the outer circumferential surface thereof, wherein the driven rotator is the polishing roller.

15. The drive transmission unit according to claim 14, wherein the drive transmission unit is turned around the turning shaft portion together with the polishing unit to bring the polishing roller in contact with the outer circumferential surface of the fixing member when quality of an image fixed by the fixing member is degraded.

16. A fixing device comprising:
a fixing member to fix a toner image onto a recording medium with heat;
a pressing member to press the recording medium against the fixing member with a prescribed size of pressure when the fixing member fixes the toner image onto the recording medium, a contacting condition of the pressing member and the fixing member is adjusted by displacing one of the pressing member and the fixing member regarding the other one of the pressing member and the fixing member;
a driven unit including a driven rotator to either engage or disengage from one of the fixing member and the pressing member to apply a post fixing process thereto; and
a drive transmission unit coupled to the driven unit, the drive transmission unit including,
a driving source,
a drive transmission member to transmit driving force from the driving source to the driven rotator by engaging the driven rotator; and
a basal plate with a turning shaft portion at one end thereof supporting the drive transmission member thereon,
wherein the drive transmission unit is turned around the turning shaft portion together with the driven unit when one of the pressing member and the fixing member is displaced regarding the other one of the pressing member and the fixing member;
wherein a turning direction of the drive transmission unit is substantially orthogonal to a direction of driving reaction force applied to the drive transmission member by the driven rotator when the driven rotator receives the driving force from the drive transmission member.

17. The fixing device according to claim 16, wherein the driven unit includes a cleaning web to wipe off toner residue remaining on a surface of one of the fixing member and the pressing member in the post fixing process.

18. The fixing device according to claim 16, wherein the driven unit includes a polishing member to polish a surface of one of the fixing member and the pressing member to recover a prescribed surface condition in the post fixing process.

19. An image forming apparatus comprising:
an image forming device to form a toner image on a recording medium;
a recording medium conveyor to convey the recording medium from the toner image forming device;

the fixing device according to claim 18;
an ejection tray provided downstream of the fixing device; and
a recording medium ejector to eject the recording medium bearing the toner image fixed by the fixing device thereon onto the ejection tray.

\* \* \* \* \*